United States Patent
Masaki et al.

(10) Patent No.: US 7,072,252 B2
(45) Date of Patent: Jul. 4, 2006

(54) OPTICAL RECORDING DEVICE, AND METHOD OF DETERMINING OPTIMUM FOCUS OFFSET VALUE FOR THE DEVICE

(75) Inventors: Takashi Masaki, Kawasaki (JP); Toru Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 10/245,484

(22) Filed: Sep. 17, 2002

(65) Prior Publication Data

US 2003/0161229 A1 Aug. 28, 2003

(30) Foreign Application Priority Data

Feb. 28, 2002 (JP) .............................. 2002-054851

(51) Int. Cl.
*G11B 7/00* (2006.01)
(52) U.S. Cl. .................................. 369/44.29; 369/53.35
(58) Field of Classification Search ............. 369/44.27, 369/44.29, 53.35, 53.26
See application file for complete search history.

(56) References Cited

U.S. PATENT DOCUMENTS

| | | | | |
|---|---|---|---|---|
| 5,164,932 A * | 11/1992 | Fennema et al. | ........ | 369/44.29 |
| 5,568,461 A | 10/1996 | Nishiuchi et al. | ........... | 369/110 |
| 5,748,584 A | 5/1998 | Maezawa | ................. | 369/44.29 |
| 5,796,704 A | 8/1998 | Nanba et al. | ................ | 369/116 |
| 5,808,989 A | 9/1998 | Ueki et al. | | |
| 5,828,636 A | 10/1998 | Matsumoto et al. | ..... | 369/44.27 |
| 5,970,032 A | 10/1999 | Ikeda et al. | ............... | 369/44.29 |
| 6,240,055 B1 | 5/2001 | Takamine et al. | | |
| 6,246,041 B1 | 6/2001 | Nakayama et al. | ...... | 250/201.5 |
| 2002/0031060 A1 * | 3/2002 | Mashimo et al. | ........ | 369/44.29 |
| 2002/0048237 A1 * | 4/2002 | Suzuki et al. | ............. | 369/44.29 |
| 2002/0054552 A1 * | 5/2002 | Ohtsuka | ................... | 369/47.53 |
| 2002/0122359 A1 * | 9/2002 | Yoshida | .................... | 369/44.11 |
| 2003/0043713 A1 * | 3/2003 | Takeda | ...................... | 369/47.53 |
| 2004/0090885 A1 * | 5/2004 | Nishiuchi et al. | ......... | 369/44.29 |
| 2004/0114482 A1 * | 6/2004 | Yano et al. | ............... | 369/47.52 |

FOREIGN PATENT DOCUMENTS

| | | |
|---|---|---|
| EP | 392 561 | 10/1990 |
| EP | 586 084 | 3/1994 |

(Continued)

*Primary Examiner*—Brian E. Miller
*Assistant Examiner*—Peter Vincent Agustin
(74) *Attorney, Agent, or Firm*—Greer, Burns & Crain, Ltd

(57) ABSTRACT

The present invention provides a low-cost optical recording device that determines an optimum quantity of light for recording and reproducing, and an optimum focus offset value. The present invention also relates to a method of determining such an optimum focus offset value. The optical recording device is equipped with a focus control system for performing a focus control operation to focus light from a light source onto a recording face of an optical recording medium. This optical recording device includes: a focus offset value setting unit for sequentially setting a plurality of offset values for the focus control system; an adder unit for using each focus offset value to adjust the focus control system; a light quantity setting unit for sequentially setting a quantity of recording light emitted from the light source at a plurality of predetermined values; a recording unit for recording information on the optical recording medium; an error rate measuring unit for measuring an error rate in the information reproduced from the optical recording medium; and an optimum focus offset value determining unit for determining an optimum focus offset value based on the measured error rate.

21 Claims, 15 Drawing Sheets

FOREIGN PATENT DOCUMENTS

| | | |
|---|---|---|
| EP | 0 840 295 A2 | 5/1998 |
| EP | 0 896 326 A2 | 2/1999 |
| JP | 6-026285 | 2/1994 |
| JP | 8-129754 | 5/1996 |
| JP | 8-273182 | 10/1996 |
| JP | 8-306052 | 11/1996 |
| JP | 10-208247 | 8/1998 |
| JP | 11-007638 | 1/1999 |
| JP | 2000-90431 | 3/2000 |
| JP | 2000-099980 | 4/2000 |
| JP | 2000-105934 | 4/2000 |
| JP | 2001-23165 | 1/2001 |
| JP | 2001-023165 | 1/2001 |
| JP | 2002-025066 | 1/2002 |

* cited by examiner

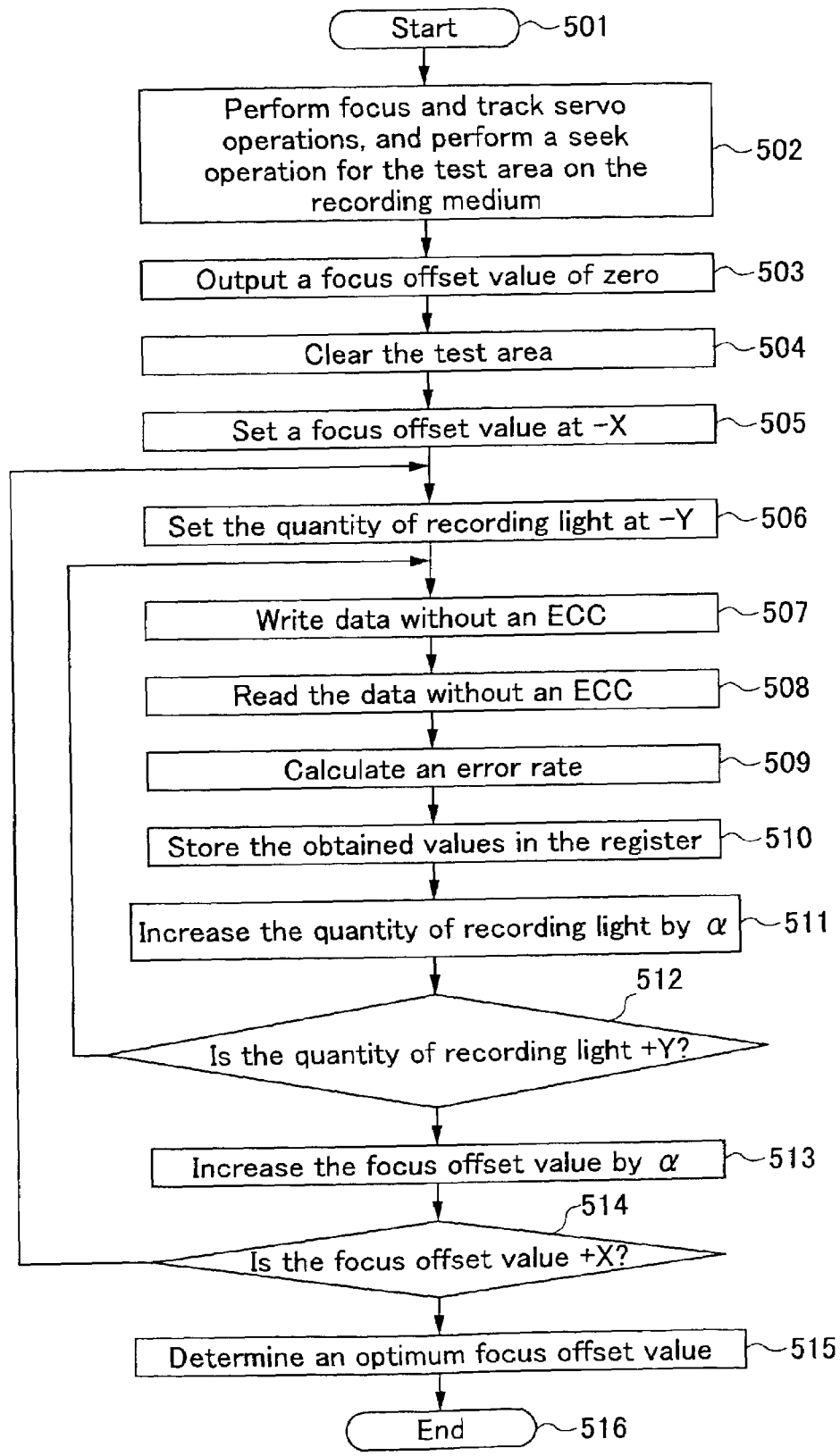

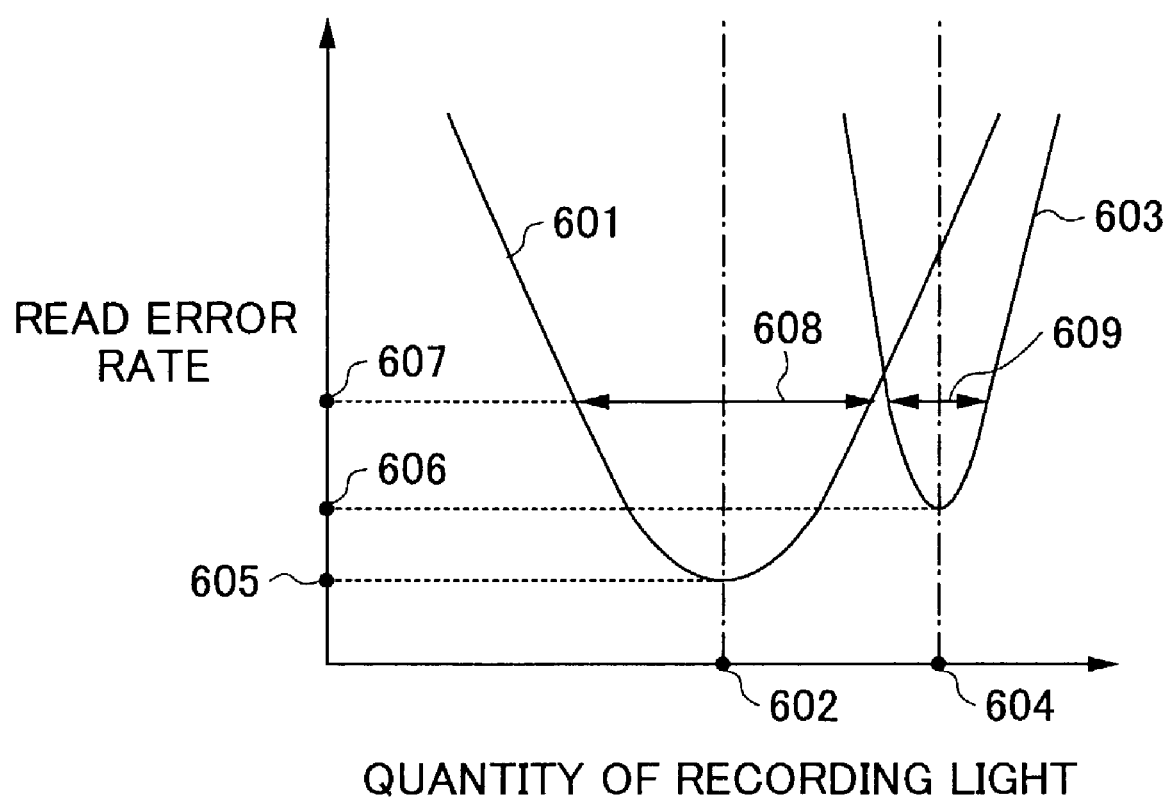

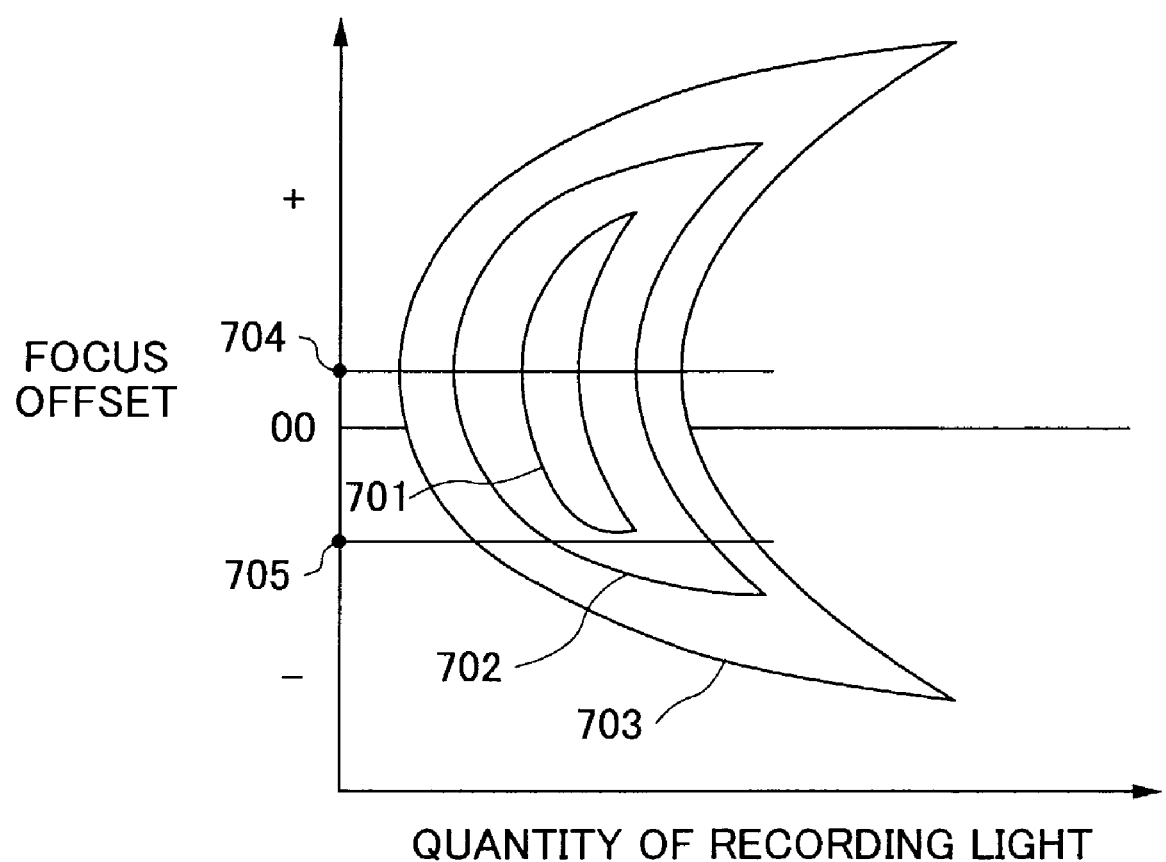

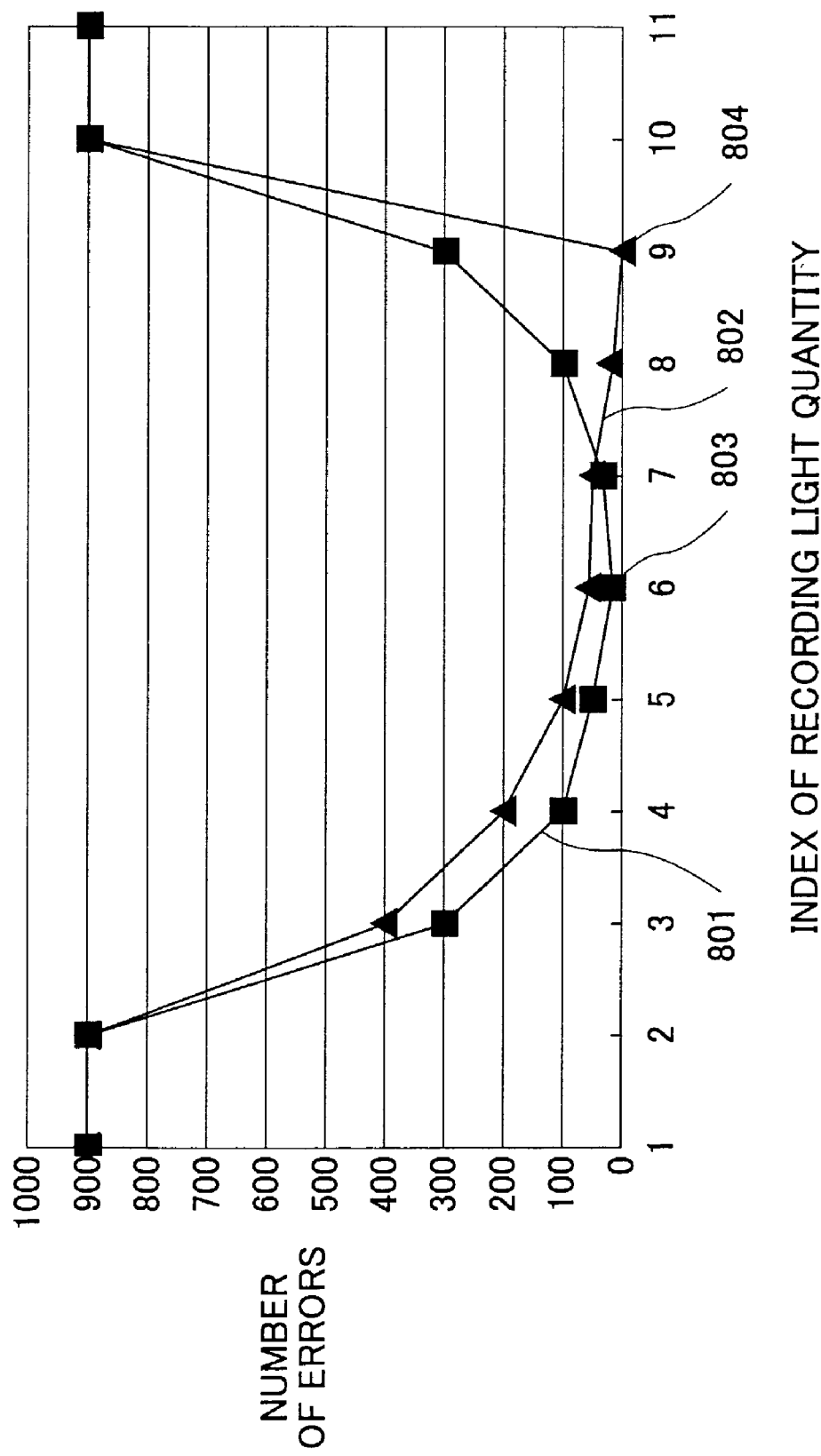

FIG.9A

| INDEX OF RECORDING LIGHT QUANTITY (Xx) | NUMBER OF ERRORS | LARGEST NUMBER OF ERRORS − NUMBER OF ERRORS (Yx) |
|---|---|---|
| 1 | 900 | 0 |
| 2 | 900 | 0 |
| 3 | 300 | 600 |
| 4 | 100 | 800 |
| 5 | 40 | 860 |
| 6 | 10 | 890 |
| 7 | 40 | 860 |
| 8 | 100 | 800 |
| 9 | 300 | 600 |
| 10 | 900 | 0 |
| 11 | 900 | 0 |

| LEAST ERROR VALUE | 6 |
|---|---|
| WEIGHTED MEAN VALUE | 6 |

FIG.9B

| INDEX OF RECORDING LIGHT QUANTITY (Xx) | NUMBER OF ERRORS | LARGEST NUMBER OF ERRORS − NUMBER OF ERRORS (Yx) |
|---|---|---|
| 1 | 900 | 0 |
| 2 | 900 | 0 |
| 3 | 400 | 500 |
| 4 | 200 | 700 |
| 5 | 100 | 800 |
| 6 | 70 | 830 |
| 7 | 50 | 850 |
| 8 | 30 | 870 |
| 9 | 10 | 890 |
| 10 | 900 | 0 |
| 11 | 900 | 0 |

| LEAST ERROR VALUE | 9 |
|---|---|
| WEIGHTED MEAN VALUE | 6.3 |

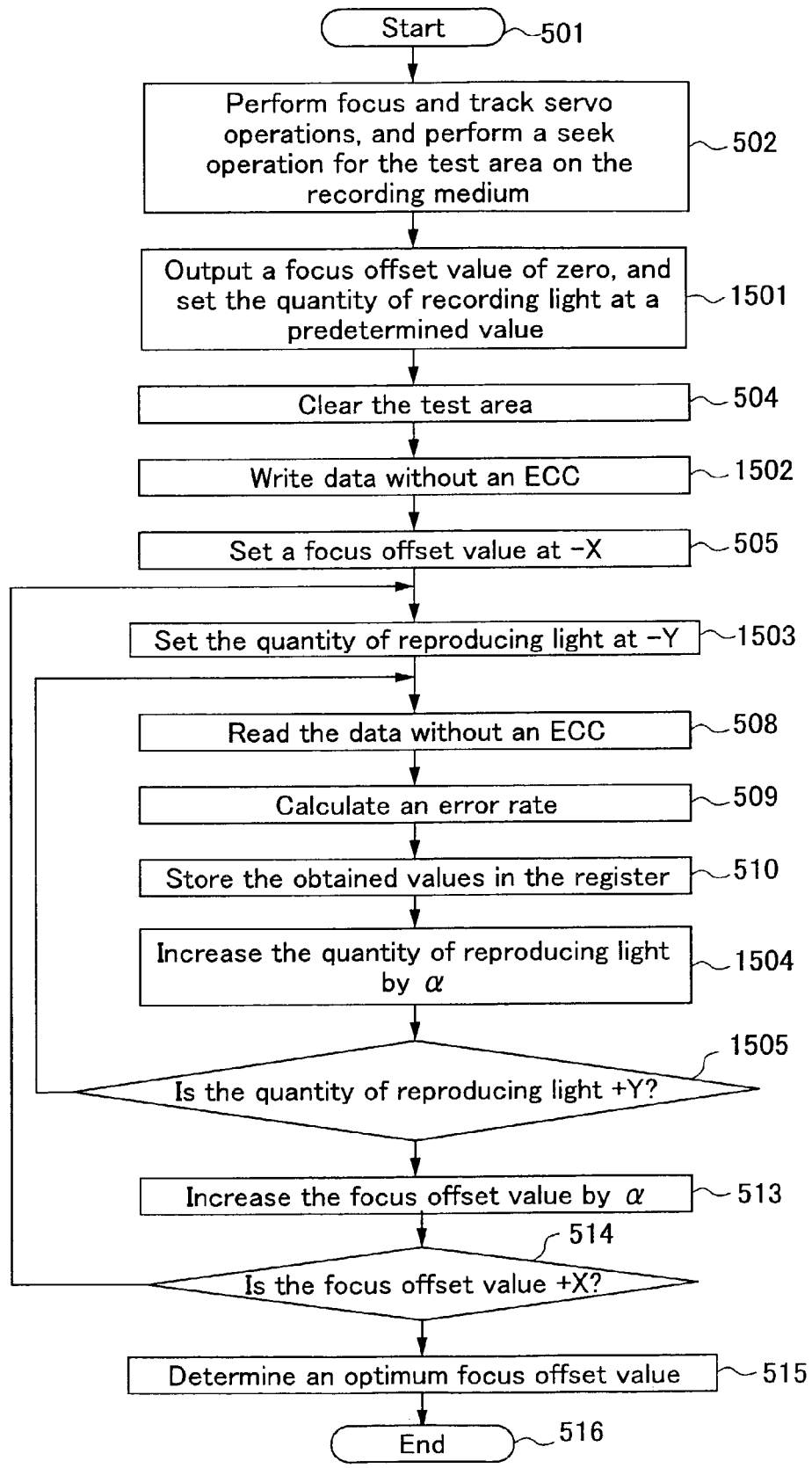

OPTICAL RECORDING DEVICE, AND METHOD OF DETERMINING OPTIMUM FOCUS OFFSET VALUE FOR THE DEVICE

BACKGROUND OF THE INVENTION

The present invention generally relates to optical recording devices, and, more particularly, to an optical recording device that can set an optimum focus offset value and a method of determining an optimum focus offset value.

To record information on a recording face of an optical recording medium and then reproduce the information from the optical recording medium, it is necessary to perform a control operation to focus the light emitted from a light source, such as a laser diode, onto the recording face of the optical recording medium, and to maintain the "just-focus" state. This control operation is referred to as a "focus servo control operation".

FIG. 1 shows an example of a conventional optical recording device 1 that records information on an optical recording medium 10 of a magneto-optical disk type, or reads out information from the optical recording medium 10. The optical recording device 1 shown in FIG. 1 includes a control unit 2 and a disk enclosure 3.

The control unit 2 includes a host interface 11, a buffer memory 12, an MPU 13, an optical disk controller 14, a read/write LSI 15, a DSP 16, a focusing error signal detecting circuit 17, a tracking error signal detecting circuit 18, a tracking zero-cross detecting circuit 19, and drivers 20 through 23. The enclosure 3 includes a laser diode unit 31, an ID/MO signal detector 32, a head amplifier 33, a spindle motor 34, a magnetic field applier 35, a focusing error detector 36a, a tracking error detector 36b, a focusing actuator 37, a tracking actuator 38, and an object lens system 40.

The host interface 11 interfaces with a host device such as a personal computer. The data transmitted between the host interface 11 and the host device are temporarily stored in the buffer memory 12. The MPU 13 and the disk controller 14 control the operations of the optical recording device 1. memory 12. The MPU 13 and the disk controller 14 control the operations of the optical recording device 1.

The read/write LSI 15 modulates and demodulates data. To write data on the optical recording medium 10, the read/write LSI 15 modulates the write data and supplies the modulated write data to the laser diode unit 31. On the other hand, to read data from the optical recording medium 10, the read/write LSI 15 controls the laser diode unit 13 to emit read light.

The read light emitted from the laser diode unit 31 onto the optical recording medium 10 is reflected by the optical recording medium 10, and thus is supplied to the ID/MO signal detector 32, the focusing error detector 36a, and the tracking error detector 36b. The Id./MO signal detector 32 detects the ID/MO signal component from the read light reflected by the optical recording medium 10, and sends the detected ID/MO signal to the head amplifier 33. The head amplifier 33 in turn amplifies the ID/MO signal, and sends the amplified ID/MO signal to the read/write LSI 15. The read/write LSI 15 demodulates ID data from the ID/MO signal. The data demodulated by the read/write LSI 15 is stored in the buffer memory 12.

The focusing error detector 36a converts the incident light to an electric signal, and sends the electric signal to the focusing error signal detecting circuit 17. Based on the electric signal sent from the focusing error detector 36a, the focusing error signal detecting circuit 17 generates a focusing error signal E1.

The focusing error signal E1 generated by the focusing error signal detecting circuit 17 is then supplied to the DSP 16. Based on the focusing error signal E1, the DSP 16 generates a focus control signal, and then sends the focus control signal to the driver 22. Based on the focus control signal supplied from the DSP 16, the driver 22 supplies a drive current to the focusing actuator 37. Based on the drive current supplied from the driver 22, the focusing actuator 37 moves the object lens system 40 in the focusing direction. By doing so, the laser light emitted from the laser diode unit 31 is focused on the optical recording medium 10.

The tracking error detector 36b converts the incident light to an electric signal, and sends the electric signal to the tracking error signal detecting circuit 18. Based on the electric signal supplied from the tracking error detector 36b, the tracking error signal detecting circuit 18 generates a tracking error signal E2. The tracking error signal E2 detected by the tracking error signal detecting circuit 18 is then supplied to the DSP 16 and the tracking zero-cross signal detecting circuit 19. Based on the tracking error signal E2, the tracking zero-cross signal detecting circuit 19 generates a tracking zero-cross signal E3, and supplies the tracking zero-cross signal E3 to the DSP 16. Based on the tracking error signal E2 and the tracking zero-cross signal E3, the DSP 16 generates a tracking control signal, and supplies the tracking control signal to the driver 23.

Based on the tracking control signal supplied from the DSP 16, the driver 23 supplies a drive current to the tracking actuator 38. The tracking actuator 38 is driven based on the drive current supplied from the driver 23, and moves the object lens system 40 in the radial direction of the optical recording medium 10, thereby performing a tracking operation.

The MPU 13 generates a spindle motor control signal, and supplies the spindle motor control signal to the driver 20. Based on the spindle motor control signal supplied from the MPU 13, the driver 20 rotates the spindle motor 34.

The MPU 13 also generates a magnetic field control signal, and supplies the magnetic field control signal to the driver 21. Based on the magnetic field control signal supplied from the MPU 13, the driver 21 supplies a drive current to the magnetic field applier 35. The magnetic field applier 35 then generates a bias magnetic field in accordance with the drive current supplied from the driver 21. The bias magnetic field generated by the magnetic field applier 35 is applied to the optical recording medium 10 for information recording and/or reproduction.

The optical recording device 1 is designed in such a manner that the optical recording device 1 is in a "just focus" state when a focus servo control operation is performed. However, a shift from the "just focus" position occurs over a time interval, and therefore it is necessary to correct such a shift so that the optical recording device 1 can return to the "just focus" state. To do so, it is necessary to determine the location of the "just focus" position.

FIG. 2 shows the relationship between the recording face of a recording medium and a laser beam emitted onto the recording face. In FIG. 2, reference numeral 203 indicates a laser beam focused onto the recording face 202 of the optical recording medium 10. Reference numeral 204 indicates a laser beam emitted onto the recording face 202 of the optical recording medium 10 in a case where a negative offset value is given, and reference numeral 205 indicates a laser beam reflected from the recording face 202 in such a case.

Reference numeral 206 indicates a laser beam emitted onto the recording face 202 of the optical recording medium 10 in a case where a positive offset value is given to the focus error signal, and reference numeral 207 indicates a laser beam reflected from the recording face 202 in such a case. As shown in FIG. 2, under the focus servo control, the "just focus" point can be moved forward or backward on the recording face of the optical disk by giving an offset value to the focus error signal.

Examples of conventional methods of searching for a "just focus" point by adjusting a focus offset value includes a method in which a focus offset value is changed while a focus servo control operation and a tracking servo control operation are performed, and the focus offset value, at which the amplitude of the ID signal becomes greatest and the "just focus" point is located, is determined to be the optimum focus offset value.

Alternatively, the focus offset value may be changed while a focus servo control operation and a tracking servo control operation are both performed, and the point where the amplitude of the MO signal becomes greatest is determined to be the "just focus" point. Further, the point where the maximum quantity of light reflected from the optical recording medium is determined to be the "just focus" point. In yet another example of the conventional method, a tracking servo control is stopped, and the point where the amplitude of the tracking error signal becomes greatest is determined to be the "just focus" point.

In a conventional optical recording device, the recording density of an optical recording medium is relatively low. This is why the read error rate can be constantly maintained below a predetermined value by determining the "just focus" point and the optimum focus offset value in the above methods.

Continuing the trend of recent years, however, the recording density of recording media is becoming higher, and the tolerable range for defocusing with a read error rate below a predetermined value is becoming narrower. With a high-density recording medium, even if the focus offset value at which the "just focus" point is located is determined to be the optimum focus offset value in any of the above conventional methods, the read error data cannot be maintained below a predetermined value.

To solve this problem, it is necessary to determine a more accurate optimum quantity of light for recording and reproducing, and a more accurate optimum focus offset value.

Japanese Laid-Open Patent Application No. 8-129754 discloses a method of determining an optimum quantity of recording light. In this method, the optimum quantity of recording light is set so that the deviation signal of two recording patterns becomes zero with the quantity of recording light. However, this method requires a circuit prepared especially for measuring the deviation signal, which results in higher costs.

Japanese Laid-Open Patent Application No. 2001-23165 discloses a method of determining an optimum focus offset value. In this method, the focus offset value is changed while the quantity of recording light is maintained at a constant value, and information is recorded on an optical recording medium with the varying focus offset value. The tolerable range of the focus offset value for reproducing information is determined from whether the information recorded on the optical recording medium can be reproduced. The quantity of recording light is then decreased while the focus offset value is varied, and information is recorded on the optical recording medium. The information recorded on the optical recording medium is then reproduced, and the tolerable range of the focus offset value for reproducing the information is determined from the reproduced results. These procedures are repeated, and the optimum focus offset value is determined to be the focus offset value at which the quantity of recording light becomes smallest. The optimum quantity of recording light is then determined by adding a predetermined value to the smallest quantity of recording light. In this conventional method, however, a true optimum quantity of recording light cannot be determined. Also in this conventional method, an optimum focus offset value cannot be determined in a case where the curve representing the read error rate to the quantity of light for recording and reproducing or the curve representing the read error rate to the focus offset value is not symmetrical with respect to the point of the lowest error rate.

Japanese Laid-Open Patent Application No. 2001-23165 discloses another method of determining an optimum focus offset value. In this method, the optimum focus offset value is determined to be the focus offset value at which a reproduction signal jitter becomes smallest. However, this method requires a circuit prepared especially for measuring the reproduction signal jitter, which results in higher costs.

SUMMARY OF THE INVENTION

A general object of the present invention is to provide optical recording devices and methods of determining optimum focus offset values in which the above disadvantages are eliminated.

A more specific object of the present invention is to provide a low-cost optical recording device that can determine an optimum focus offset value, even though the tolerable value for defocusing is small in a high-density optical recording medium, and in which the read error rate is lower than a predetermined value. Another specific object of the present invention is to provide a method of determining such an optimum focus offset value.

The above objects of the present invention can be achieved by an optical recording device that is equipped with a focus control system for performing a focus control operation to focus light emitted from a light source onto a recording face of an optical recording medium. In one embodiment, this optical recording device includes: a focus offset value setting unit for setting a focus offset value at a plurality of offset values; an adder unit for using each focus offset value set by the focus offset value setting unit to adjust the focus control system; a light quantity setting unit for setting a quantity of recording light, which is emitted from the light source, at a plurality of predetermined values, for each focus offset value set by the focus offset value setting unit; a recording unit for recording information on the optical recording medium, using the quantity of recording light set by the light quantity setting unit; an error rate measuring unit for measuring an error rate in information reproduced from the information recorded by the recording unit; and an optimum focus offset value determining unit for determining an optimum focus offset value based on the error rate measured by the error rate measuring unit.

With this structure, a low-cost optical recording device that can set an optimum quantity of light for recording or reproducing and an optimum focus offset value can be obtained.

In accordance with another aspect of the present invention, the optimum focus offset value determining unit determines an optimum focus offset value to be the focus offset value that is set when the error rate is lowest and the quantity of recording light is smallest.

With this optimum focus offset value determining unit, an optimum focus offset value is determined so as to keep the read error rate at the lowest rate. In this manner, a true optimum focus offset value can be obtained.

Furthermore, the optimum focus offset value determining unit can calculate the quantity of recording light and the weighted mean value of the error rate, and determine an optimum focus offset value to be the focus offset value that is set when the weighted mean value of the error rate and the quantity of recording light are smallest.

With this optimum focus offset value determining unit, a true optimum focus offset value can be obtained even when the curve indicating the relationship between the read error rate and the light quantity or between the read error rate and the focus offset value is not symmetrical with respect to the point where the error rate is smallest.

The above and other objects and features of the present invention will become more apparent from the following description taken in conjunction with the accompanying drawings.

BRIEF DESCRIPTION OF THE DRAWINGS

FIG. 5 is a flowchart showing the procedures for setting an optimum focus offset value in accordance with the first embodiment of the present invention;

FIG. 6 shows a read error rate of information that is reproduced from an optical disk while the quantity of recording light is varied;

FIG. 7 shows read error rates in a contour-map fashion, with the focus offset value and the recording light being the two coordinates;

FIG. 8 shows the number of read errors in cases where information recorded on an optical disk is reproduced with a varied quantity of light for recording and reproducing;

FIGS. 9A and 9B show the number of read errors at each index point on the curves 801 and 802 shown in FIG. 8;

FIG. 15 is a flowchart of the operation of setting an optimum focus offset value in accordance with a seventh embodiment of the present invention.

DESCRIPTION OF PREFERRED EMBODIMENTS

The following is a description of embodiments of the present invention, with reference to the accompanying drawings.

Figure 1:
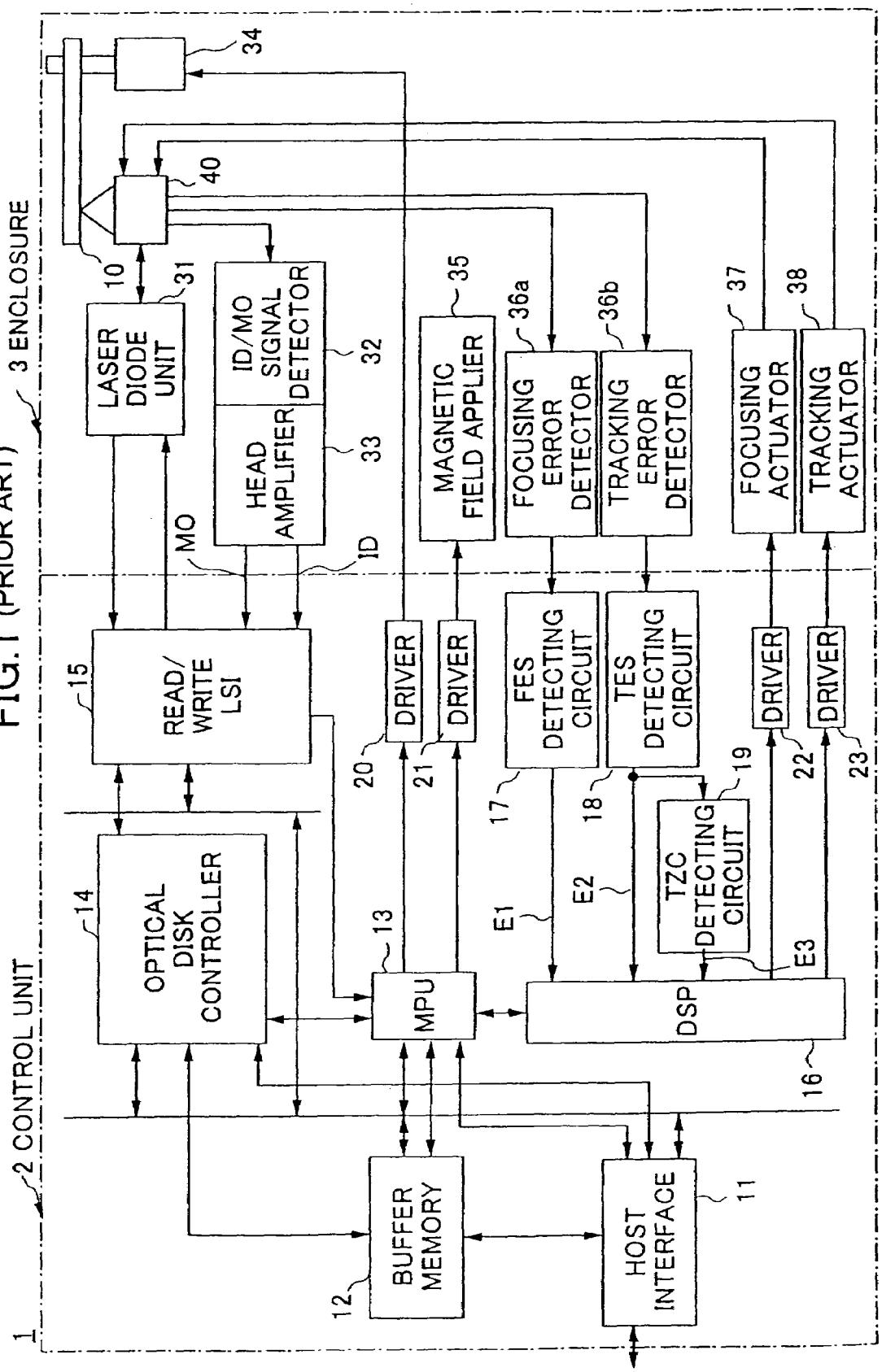
FIG. 1 shows an example of a conventional optical recording device of a magneto-optical disk type.
Figure 2:
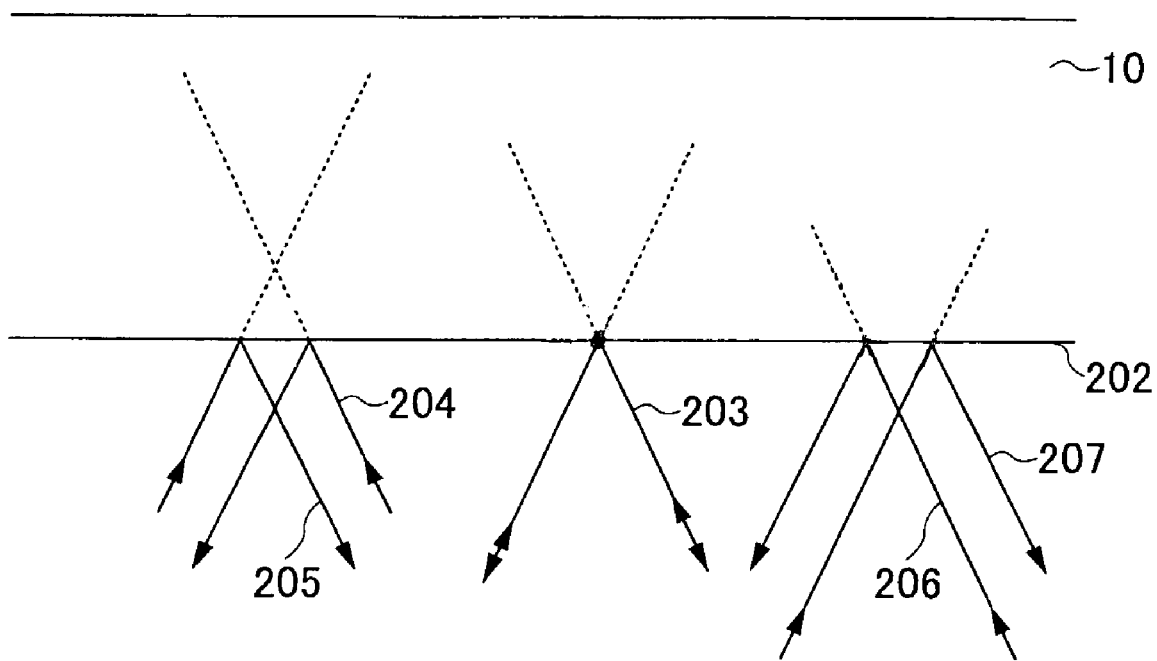
FIG. 2 shows the relationship between the recording medium surface and the laser beam impinging on the recording medium surface in the conventional optical recording device.
Figure 3:
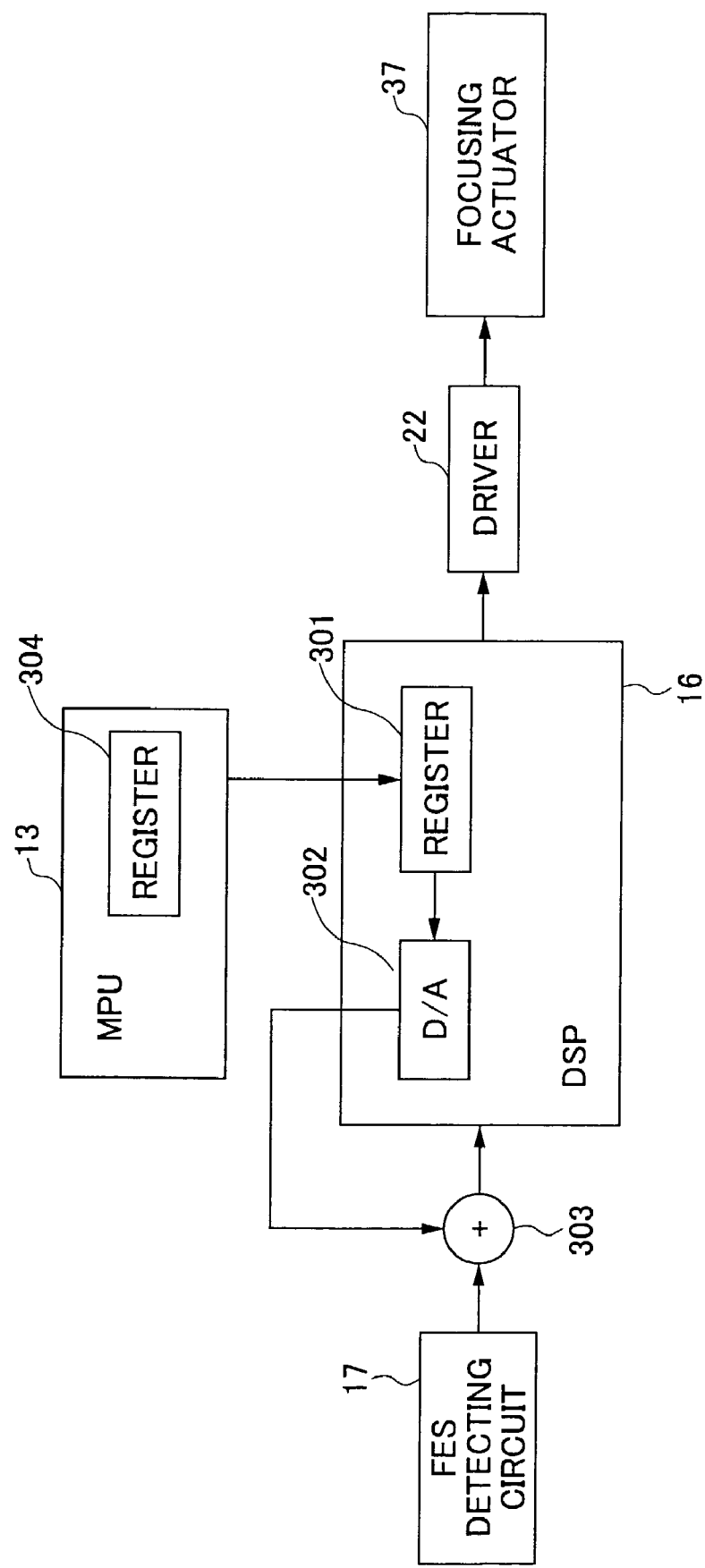
FIG. 3 is a schematic view of a focus control system in accordance with the first embodiment of the present invention.

FIG. 3 is a schematic view showing a first embodiment of the present invention. In FIG. 3, the same components as in FIG. 1 are denoted by the same reference numerals. A focus control system shown in FIG. 3 sets an optimum focus offset value in accordance with this embodiment, and includes a MPU 13 that is a control unit, a DSP 16, a focusing error signal detecting circuit 17, a driver 22, a focusing actuator 37, and an adder 303. The MPU 13 includes a register 304 that temporarily stores information. This register 304 may be located outside the MPU 13. The DSP 16 includes a register 301 that receives offset control data transmitted from the MPU 13, and a D/A (digital-analog) converter 302 that converts the value shown by the register 301 into an analog value. The offset control data transmitted from the MPU 13 to the register 301 is written in the register 301. In accordance with the offset control data, an analog value is output from the D/A converter 302, thereby setting a focus offset value. The focus offset value is then added to a focus servo system by the adder 303. The amount of light for recording a signal on the optical recording medium 10 shown in FIG. 1 and reproducing the signal from the optical recording medium 10 is set in the read/write LSI 15 and the laser diode unit 31 in compliance with an instruction from the MPU 13.

Data to be recorded on the optical recording medium 10 are normally sent from a host device such as a personal computer via the host interface 11, and are temporarily stored in the buffer memory 12 before being recorded on the optical recording medium 10. In this embodiment, however, the MPU 13 may read test data out from a control data memory that are used only for determining an optimum focus offset value. The test data may be temporarily stored in the buffer memory 12 before a recording operation and a reproducing operation are performed on the optical recording medium 10.

In this embodiment, the MPU 13, which is the control unit, compares the information recorded on the optical recording medium 10 with the information reproduced from the optical recording medium 10, and thus forms an error rate measuring function for measuring the error rate of the reproduced information and an optimum focus offset value determining function for determining an optimum focus offset value based on the measured error rate.

Figure 4:
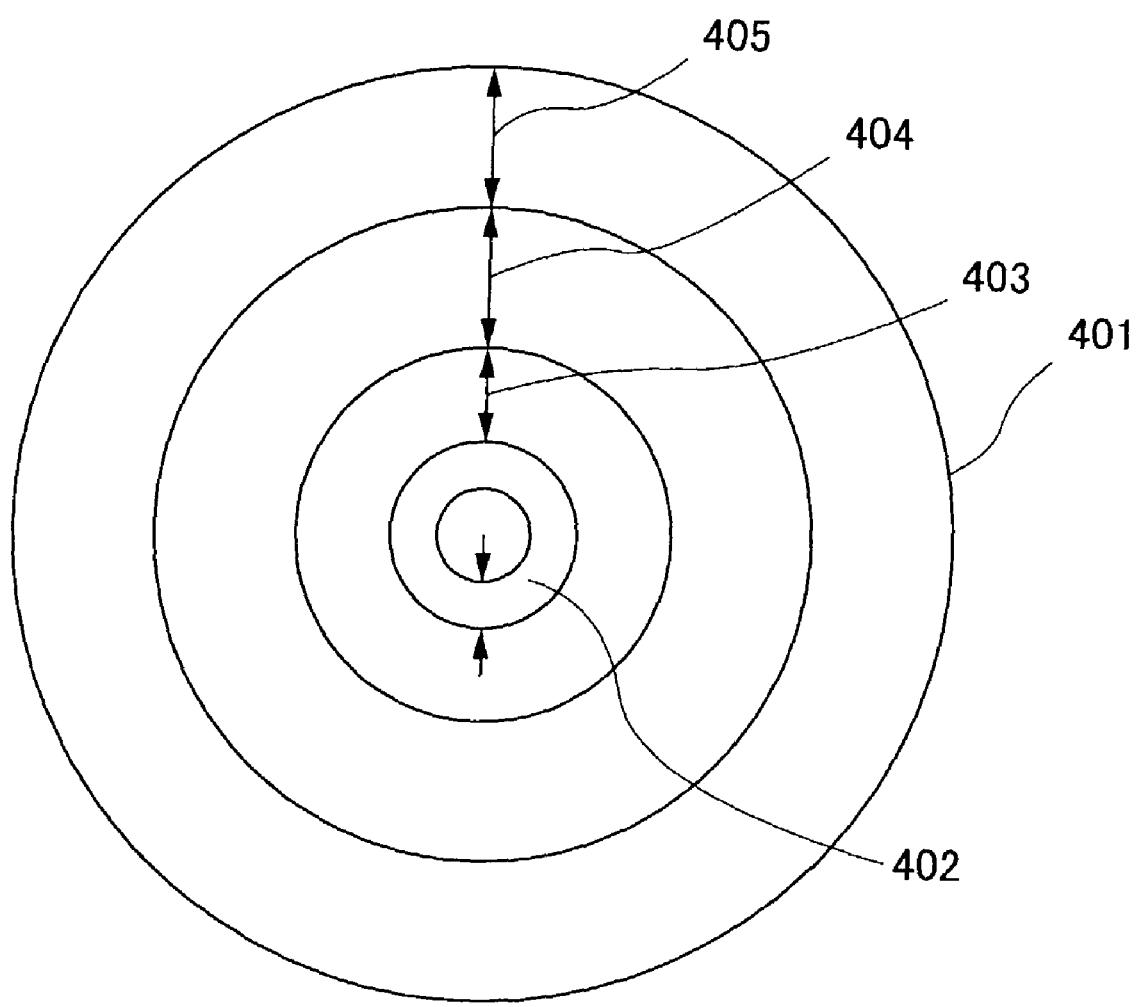
FIG. 4 shows an optical disk as an example of the optical recording medium, for which an optimum focus offset value is set in accordance with the first embodiment of the present invention.

FIG. 4 shows an optical disk 401 as an example of the optical recording medium 10 for which an optimum focus offset value is set in this embodiment. Although the optical disk 401 is taken as an example of the optical recording medium in this embodiment, the present invention can also be applied to an optical recording medium not having a disk-like shape, such as an optical recording card. In this embodiment, the optical disk 401 includes a test area 402, and zones 403, 404, and 405, each of which contains a certain number of tracks in the radial direction.

Referring now to FIG. 5, the operations in accordance with this embodiment will be described in detail. FIG. 5 is a flowchart showing the procedures for setting an optimum focus offset value in accordance with the first embodiment of the present invention. After the operation starts in step

501, the MPU 13 sends an instruction to the DSP 16 shown in FIG. 1, and drives the focusing actuator 37 and the tracking actuator 38 via the drivers 22 and 23, thereby performing a focus servo operation and a tracking servo operation in step 502. The MPU 13 then conducts a seek operation for the test area 402, and positions a light beam. In step 503, the MPU 13 shown in FIG. 3 supplies the register 301 with data indicating that the focus offset value is zero, and the offset value of zero is output from the D/A converter 302 and added by the adder 303. In step 504, the test area is cleared. In this manner, by setting the focus offset value at zero at the time of erasing, the data recorded on the tracks can be surely erased without causing much defocusing.

In step 505, the MPU 13 supplies the register 301 with data indicating that the focus offset value is –X. The D/A converter 302 converts the data to an analog value, and outputs the focus offset value of –X. When a focusing error signal is input from the DSP 16, the adder 303 adds the focus offset value to the focus control system. In this manner, the MPU 13 sets the focus offset value at –X. An analog value is added in accordance with the input from the DSP 16, so that the dynamic range of the focus control system can be secured at the maximum level.

In step 506, the MPU 13 sends an instruction to the read/write LSI 15 and the laser diode unit 31 so as to set a value of –Y as the quantity of recording light information onto the test area 402 of the optical disk 401.

In step 507, the MPU 13 controls the read/write LSI 15 and the laser diode unit 31 so as to write test information onto the test area 402 of the optical disk 401. As described earlier, the test data may be transmitted from a host device such as a personal computer via the host interface 11, and be temporarily stored in the buffer memory 12 before being recorded on the optical disk 401. In this embodiment, however, the MPU 13 may generate test data to be used only for determining an optimum focus offset value, and then temporarily store the test data in the buffer memory 12 before the recording on the optical disk 401.

In this embodiment, information is recorded on the optical disk 401 without an error correction code (ECC). This is because a true error rate cannot be measured if the DSP 16 corrects an error contained in the reproduced information using the error correction code. Also, the information to be recorded (test data) is held in the buffer memory 12 for comparison with the reproduced information until the error rate measurement described later is completed.

In step 508, the information recorded on the test area 402 of the optical disk 401 is reproduced without being corrected for errors. The information reproduced in this manner is then temporarily stored in the buffer memory 12.

In step 509, the MPU 13 compares the reproduced information with all the information remaining in the buffer memory 12, so as to calculate an error rate of the reproduced information. More specifically, a bit comparison is conducted for each bit of the recorded data and the reproduced data, and the number of error bits is obtained. A bit error rate is then calculated from the proportion of the error bits to the total number of bits. In step 510, the error rate, the focus offset value of –X, and the recording light quantity value of –Y are stored in the register 304 in the MPU 13 shown in FIG. 3. In this manner, the error rate of the information reproduced from the recorded information, with the focus offset value of –X and the recording light of –Y, can be measured and stored.

In step 511, the recording light of –Y, which has been set in step 506, is increased by α.

In step 512, it is determined whether the increased recording light has reached a predetermined value of +Y. If the increased recording light has not reached the predetermined value of +Y, certain tracks in the test area are cleared, and steps 507 through 511 are repeated. In this manner, an error rate with the focus offset value of –X and the varied quantity of recording light is measured and then stored.

If it is determined in step 512 that the increased recording light has reached the predetermined value of +Y, the operation moves on to step 513, in which the focus offset value is increased by α.

In step 514, it is determined whether the increased focus offset value has reached a predetermined value of +X. If it is determined that the increased focus offset value has not reached the predetermined value of +X, steps 506 through 513 are repeated, and an error rate with the focus offset value increased by α and the recording light quantity value varying from –Y to +Y are measured and then stored.

If it is determined in step 514 that the increased focus offset value has reached the predetermined value of +X, the operation moves on to step 515, in which an optimum focus offset value is determined. The process of determining an optimum focus offset value will be described later.

After an optimum focus offset value is determined, the operation comes to an end in step 516. Using the optimum focus offset value determined in the above manner, regular operations such as a recording operation and a reproducing operation are performed.

Next, the method of determining an optimum focus offset value will be described.

FIG. 6 shows a read error rate of reproduced information, which is measured while the quantity of recording light is varied. The curves 601 and 603 shown in FIG. 6 indicate the read error rates of information in cases where the information is recorded and then reproduced while the quantity of recording light is varied. More specifically, the curve 601 indicates the read error rate of the information in a case where an optimum focus offset value has been set. For this case, the optimum light quantity is indicated by a light value 602 at which the read error rate 605 is the lowest. Meanwhile, the curve 603 indicates the read error rate of the information in a case where the focus offset value is not equal to the optimum focus offset value. For this case, the optimum light quantity is indicated by a light value 604 at which the read error rate is the lowest. As shown in FIG. 6, when the focus offset value differs from the optimum focus offset value, the relationship between the quantity of recording light and the read error rate changes from the one indicated by the curve 601 to the one indicated by the curve 603. With this change in the relationship, the read error rate at the optimum light value increases from a read error rate 605 to a read error rate 606, and the range of recording light values at which a read error rate lower than a predetermined error rate 607 can be obtained (this range will be hereinafter referred to as "power margin") narrows from a power margin 608 to a power margin 609. As the focus offset value for curve 603 differs from the optimum focus offset value, defocusing is caused, and the focal point of the laser light shifts away from the recording face of the optical disk 401. Because of this, a larger quantity of recording light is required.

FIG. 7 shows read error rates in a contour-map fashion, with the focus offset value and the recording light being the two coordinates. In FIG. 7, the area defined by a crescent curve 701 indicates the range in which the read error rate is the lowest. The area defined by crescent curves 701 and 702 indicates the range in which the read error rate has an intermediate value. The area defined by crescent curves 702 and 703 indicates the range in which the read error rate is high. The area outside the crescent curve 703 indicates the range in which the read error rate is even higher.

In the case shown in FIG. 7, the optimum focus offset value is the value indicated by a focus offset value 704. If the focus offset value is increased or decreased from the optimum focus offset value 704, the optimum quantity of recording light increases. Also, the read error rate becomes higher than the read error rate with the optimum offset value 704, and the aforementioned "power margin" decreases even with the optimum quantity of recording light. In accordance with the conventional method of determining an optimum focus offset value, a focus offset value 705 is set so that the focus offset value at which the amplitude of the tracking error signal is the maximum can be the optimum offset value.

In step 515 shown in FIG. 5, the procedure for determining an optimum focus offset value is conducted using this principle of the prior art.

More specifically, in step 515 shown in FIG. 5, the measurement results of the read error rate measured in steps 501 through 514, and the offset value and the quantity of recording light used in the measurement are stored in the register 304 in the MPU 13. The measurement results of the read error rate stored in the register 304 in the MPU 13 are equivalent to the read error rate shown in the contour-map fashion, with the focus offset value and the recording light being the two coordinates shown in FIG. 7. Accordingly, the MPU 13, which serves as the optimum focus offset value determining unit, reads out the measurement results of the error rate stored in the register 304 in order, and, from the measurement results, the MPU 13 selects the focus offset value 704 with which the read error rate is lowest and the recording light quantity is smallest, the focus offset value that has the widest power margin, or the focus offset value that satisfies these two conditions. The MPU 13 then determines the selected focus offset value to be the optimum focus offset value.

Next, a second embodiment of the present invention will be described. According to this embodiment, an optimum focus offset value can be accurately determined, even if the curve indicating the read error rate in the reproduced information of information recorded on the optical disk 401 with varying quantities of recording light is not symmetrical with respect to the point where the read error rate is lowest. In this embodiment, the focus offset value with which the read error rate is lowest and the recording light quantity is smallest is determined to be an optimum focus offset value in step 515 shown in FIG. 5. Thus, the optimum quantity of recording light with which the read error rate is lowest can be accurately determined.

FIG. 8 shows two curves, each of which indicates the number of read errors in reproduced information obtained by reproducing information that has been recorded on the optical disk 401 with varied quantities of recording light. The abscissa axis in FIG. 8 indicates an index of a quantity of light for recording and reproducing, while the ordinate axis indicates the number of read errors. The curve 801 represents a case where the read error rate curve is symmetrical with respect to an error value 803 that indicates the smallest number of read errors. Meanwhile, the curve 802 represents a case where the read error rate curve is not symmetrical with respect to an error value 804 that indicates the smallest number of read errors.

FIG. 9A shows the number of read errors at each index point on the curve 801 shown in FIG. 8, while FIG. 9B shows the number of read errors at each index point on the curve 802 shown in FIG. 8.

In this embodiment, the optimum quantity of recording light is referred to as the weighted mean value A, and is defined as follows:

Weighted mean value $A = (X1*Y1 + \ldots + Xn*Yn)/(Y1 + \ldots + Yn)$ wherein Xn represents the index of recording light quantity, and Yn represents the number of read errors in reproduced information in a case where recording and reproducing operations are performed with the index of recoding light quantity represented by Xn, with n being an integer of 1 to 11.

As can be seen from FIG. 8 and FIG. 9A, the index point of recording light quantity with which the number of read errors becomes smallest on the curve 801 is 6, and the curve 801 indicating the number of read errors is symmetrical with respect to this index point. As can be seen from FIG. 8 and FIG. 9B, on the other hand, the index point of recording light quantity with which the number of read errors becomes smallest on the curve 802 is 9, and the curve 802 indicating the number of read errors is skewed to the right. If the optimum quantity of recording light is set at the value indicated by the index point 9 on the curve 802 in practice, the number of read errors will be greatly increased with a quantity of recoding light only slightly larger than the value indicated by the index point 9 on the curve 802. Accordingly, even in the case represented by the curve 802 shown in FIG. 8, it is preferable to set the optimum quantity of recording light at the same value as the optimum quantity of recording light indicated by the curve 801, with the margin of the optimum quantity of recording light being taken into consideration.

By setting the optimum quantity of recording light at the above-described weighted mean value A, this problem can be solved. In the case represented by the curve 801 in FIG. 8, the weighted mean value A is 8. In the case represented by the curve 802, the weighted mean value A is 6.3. Accordingly, by setting the optimum quantity of recording light at the weighted mean value A, a true optimum quantity of recording light having a margin above and below the optimum quantity of recording light can be obtained, even if the curve representing the read error rate is not symmetrical with respect to the index point that indicates the smallest read errors, as in the case represented by the curve 802.

Next, the explanation moves on to a third embodiment of the present invention. This embodiment is designed to set an optimum focus offset value for an optical recording medium that has a recording area divided into a plurality of zones.

Figure 10:
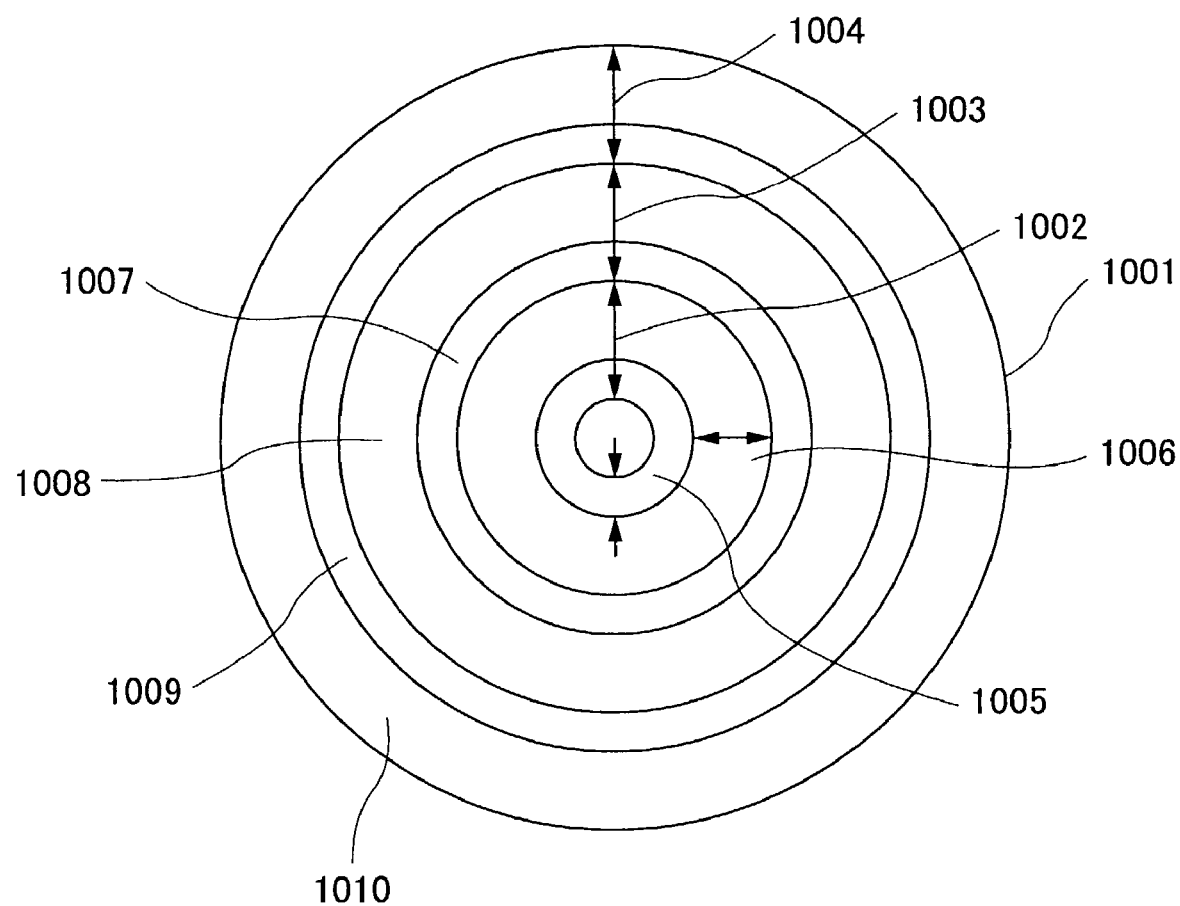
FIG. 10 shows an optical disk as an example of an optical recording medium that has a recording area divided into a plurality of zones.

FIG. 10 shows an optical disk 1001 that is an example of the optical recording medium having a recording area divided into a plurality of zones in the radial direction. The optical disk 1001 has a recording area that is divided into three zones consisting of a zone 1002, a zone 1003, and a zone 1004. The zone 1002 includes a test area 1005 and a user area 1006. The zone 1003 includes a test area 1007 and a user area 1008. The zone 1004 includes a test area 1009 and a user area 1010.

Figure 11:
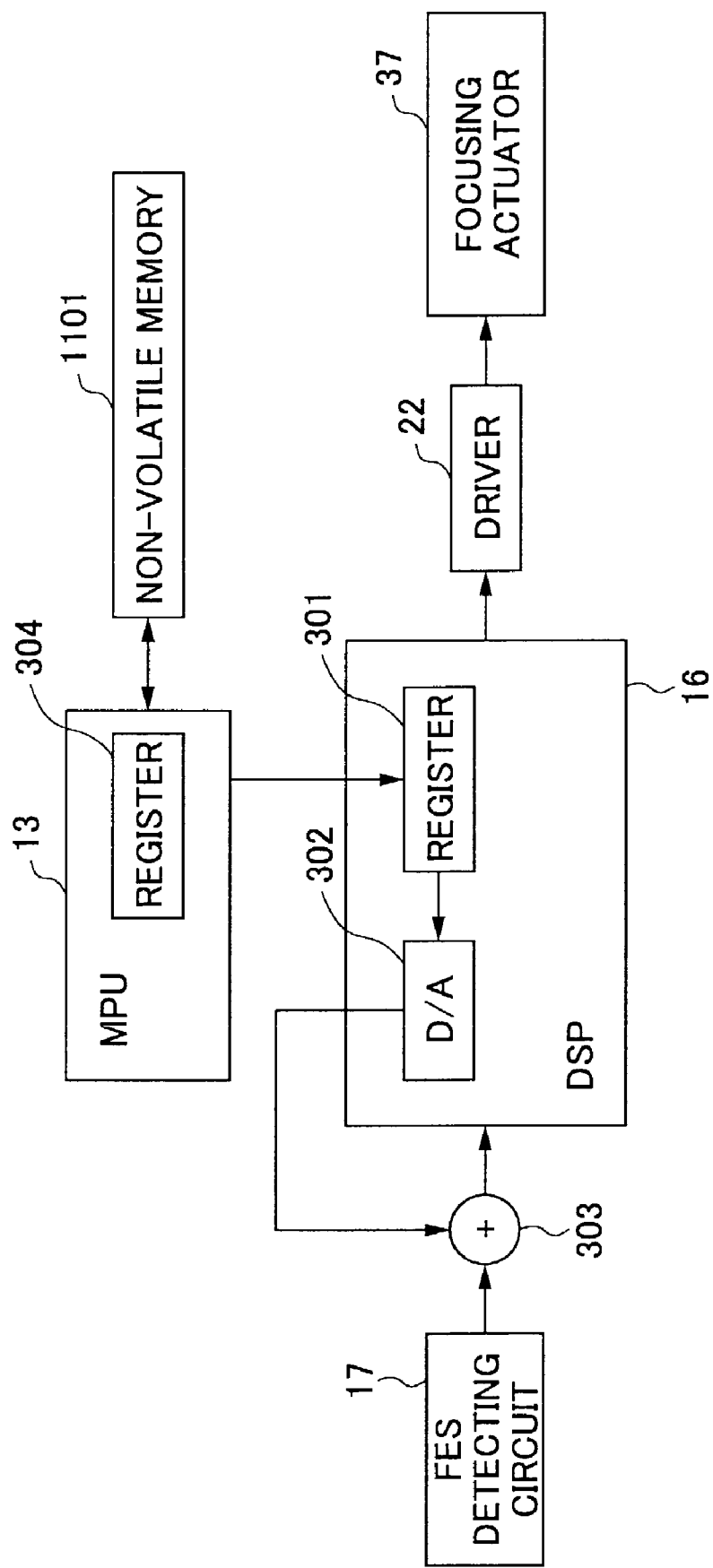
FIG. 11 shows a structure in which a third embodiment of the present invention is put into practice.

FIG. 11 shows a structure in which the third embodiment of the present invention can be put into practice. In FIG. 11, the same components as in FIG. 3 are denoted by the same reference numerals as in FIG. 3. The structure shown in FIG. 11 further includes a nonvolatile memory 1101. With an optical disk having a recording area divided into a plurality of zones as shown in FIG. 10, the zones might have different optimum focus offset values from one another, due to a warp in the disk or the like. For instance, when the disk is first mounted on the recording device 1, an optimum focus offset value is determined for each of the test areas 1005, 1007, and 1009, and is stored in the non-volatile memory 1101. When one of the zones is to be accessed, the MPU 13, which is a control unit, reads out the optimum focus offset value that has been set for the zone to be accessed, and sends the optimum focus offset value to the register 301 of the DSP 16. The register 301 in turn sends the optimum focus offset value to the D/A converter 302, which converts the optimum focus offset value to analog data. The D/A converter then sends the converted optimum focus offset value to the adder 303, which adds the converted optimum focus offset value to the focus control system. In this manner, an optimum focus offset value can be determined for each of the zones in the recording area, and thus a light beam can be accurately focused onto each of the zones on the recording face of the optical disk 1001.

Next, the explanation moves on to a fourth embodiment of the present invention. This embodiment is also designed to set an optimum focus offset value for an optical recording medium having a recording area divided into a plurality of zones.

In the optical disk 1001 having the recording area divided into a plurality of zones as shown in FIG. 10, the zone 1002 includes the test area 1005 and the user area 1006, the zone 1003 includes the test area 1007 and the user area 1008, and the zone 1004 includes the test area 1009 and the user area 1010. In the third embodiment described above, an optimum focus offset value is determined for each of the test areas 1005, 1007, and 1009, and the optimum focus offset value for each test area is stored in the nonvolatile memory 1101. However, it is also possible to set an optimum focus offset value for each of the user areas 1006, 1008, and 1010, and store the optimum focus offset value for each user area in the nonvolatile memory 1101. The determining of an optimum focus offset value should be conducted in the vicinity of the center of each user area, so that an optimum focus offset value suitable for the entire user area can be set. If an optimum focus offset value is determined at the front part of a user area, the optimum focus offset value will not be suitable for the last part of the user area, because there is a distance equivalent to one user area between the front part and the last part of the user area, and therefore the optimum focus offset values for the front part and the past part of the user area should be different from each other. When one of the zones in the recording area is to be accessed, the MPU 13 reads out the optimum offset value that has been set for the zone to be accessed, and sends the value to the register 301 of the DSP 16. The register 301 in turn sends the optimum focus offset value to the D/A converter 302, which converts the value to analog data. The D/A converter 302 then sends the converted optimum focus offset value to the adder 303, which in turn adds the optimum offset value to the focus control system. In this manner, an optimum focus offset value can be set for each of the zones in the recording area, and thus a light beam can be accurately focused onto each of the zones on the recording face of the optical disk 1001.

In the third embodiment, an optimum focus offset value for each zone is determined when the disk 1001 is mounted onto the recording device 1, and the optimum focus offset value is then stored in the non-volatile memory 1101. However, it is also possible to set an optimum focus offset value for a reference optical disk when the optical recording device is manufactured, and then store the optimum focus offset value in the non-volatile memory 1101. Alternatively, the operation of determining and storing an optimum focus offset value for each zone may be performed every time the optical disk 1001 is mounted onto the optical recording device 1.

Figure 12:
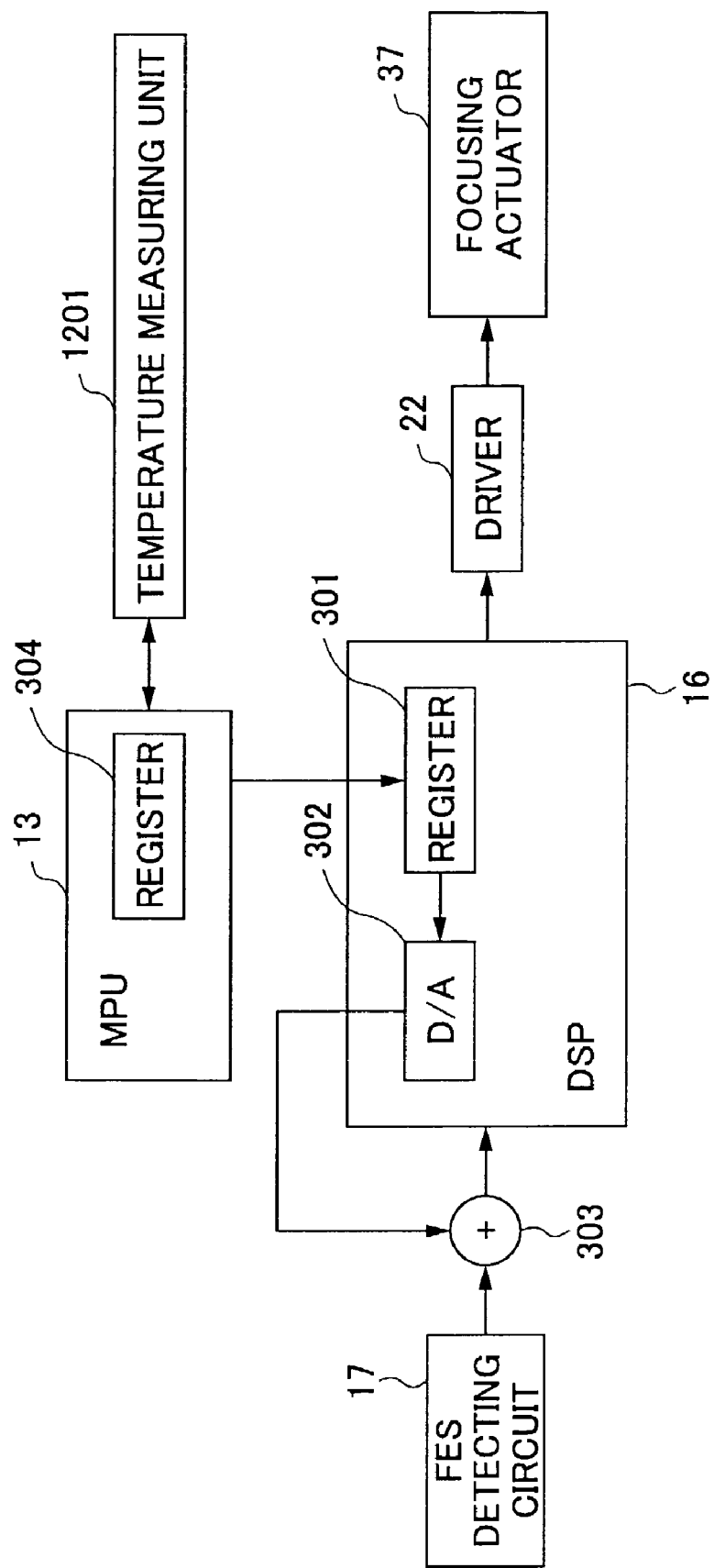
FIG. 12 is a schematic view of the structure of a focus control system in accordance with a fifth embodiment of the present invention.

Next, the explanation moves on to a fifth embodiment of the present invention. FIG. 12 is a schematic view of a structure of this embodiment. In FIG. 12, the same components as in FIG. 3 are denoted by the same reference numerals as in FIG. 3. The structure shown in FIG. 12 further includes a temperature measuring unit 1201. In the foregoing embodiments, an optimum focus offset value is determined when an optical recording medium is mounted onto the optical recording device 1 or when the optical recording device 1 is manufactured. However, after an optical recording medium such as an optical disk is mounted onto an optical recording device, the inner temperature of the optical recording device may change during a certain operation in the optical recording device. As the inner temperature of the optical recoding device fluctuates, the optical focus offset of the focus offset system changes due to a temperature change in a component such as a semiconductor part provided inside the optical recording device. To solve a problem caused by such a temperature change, the temperature measuring unit 1201 is provided in this embodiment. The temperature measuring unit 1201 measures the inner temperature of the recording device 1 when an optimum focus offset value is determined, and then outputs the temperature value to the MPU 13. The MPU 13 stores the temperature value in the register 304, and compares the temperature value stored in the register 304 with the current inner temperature of the recording device 1 measured by the temperature measuring unit 1201. If the difference between the measured temperatures is greater than a predetermined value, the above-described operation of determining an optimum focus offset value is performed again, so that a true optimum focus offset value can be constantly maintained. However, the operation of determining an optimum focus offset value is time-consuming. If such a time-consuming operation is not desirable, an optimum focus offset value can be simply adjusted to a temperature change by the MPU 13 updating the information set in the register 301 based on the temperature change or the DSP 16 calculating an adjustment value from the initial value set in the non-volatile memory 1101. Alternatively, an optimum focus offset value can be adjusted to such a temperature change by the MPU 13 simply adding a predetermined fluctuation value to the optimum focus offset value.

Figure 13:
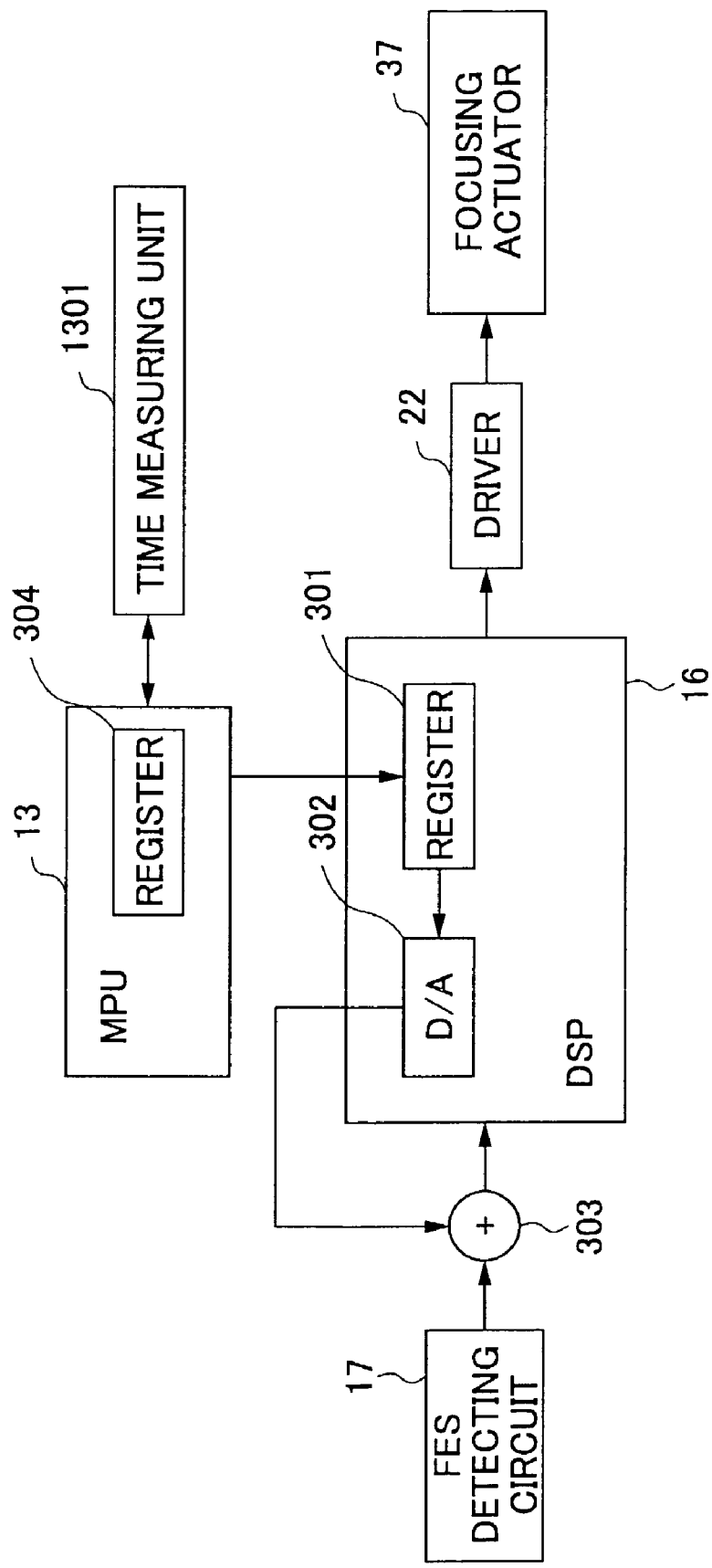
FIG. 13 is a schematic view of the structure of a focus control system in accordance with a sixth embodiment of the present invention.

Next, the explanation moves on to a sixth embodiment of the present invention. FIG. 13 is a schematic view of a structure of this embodiment. In FIG. 13, the same components as in FIG. 3 are denoted by the same reference numerals as in FIG. 3. The structure shown in FIG. 13 further includes a time measuring unit 1301. If a timer device or the like is contained in the MPU 13, such a timer device can serve as the time measuring unit 1301. In this embodiment, the time measuring unit 1301 measures the elapsed time since the determination of an optimum focus offset value. After a predetermined period of time has passed, the operation of setting an optimum focus offset value is performed again, so that a true optimum focus offset value can be constantly maintained.

As shown in FIG. 1, when a command is sent from a host device such as a personal computer via the host interface 11, the MPU 13 detects the elapsed time measured by the time measuring unit 1301. After a predetermined period of time has passed since the determination of an optimum focus offset value, the MPU 13 again performs the operation of setting an optimum focus offset value of each of the zones, so that a true optimum focus offset value can be constantly maintained. However, the continual setting of an optimum focus offset value for each of the zones is time consuming. To solve this problem, the MPU 13 detects the elapsed time measured by the time measuring unit 1301 since the start of the operation of setting an optimum focus offset value, and, after a predetermined period of time has passed, the MPU 13 temporarily stops the value setting operation. When a next command is sent from the host computer such as a personal computer, the operation of setting an optimum focus offset value is resumed.

Figure 14:
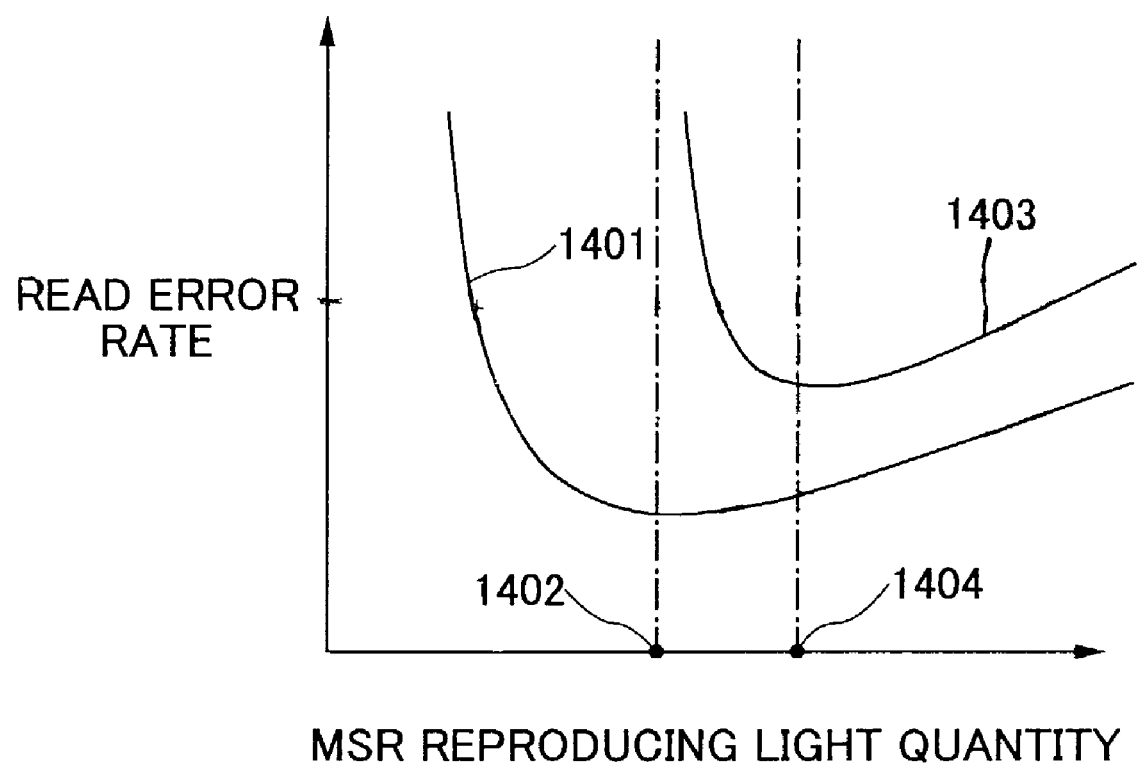
FIG. 14 shows the relationship between the quantity of reproducing light and the read error rate in a case where information recorded on an optical recording medium is reproduced by a magnetic super resolution (MSR) system.

Next, the explanation moves on to a seventh embodiment of the present invention. This embodiment is designed for a case where a magnetic super resolution (MSR) system is employed as a system for reproducing information recorded on an optical recording medium. FIG. 14 shows the relationship between the quantity of reproducing light and the read error rate in a case where information recorded on an optical recording medium is reproduced by a magnetic super resolution (MSR) system. With a magnetic super resolution system for reproducing information recorded on an optical recording medium, recording signals cannot be reproduced if the quantity of reproducing light is smaller than a predetermined value. However, if the quantity of reproducing light exceeds the predetermined value, recording signals can be reproduced. Accordingly, as the quantity of reproducing light increases to the optimum quantity of reproducing light for a particular offset value, the read error rate suddenly drops, as indicated by a curve 1401 shown in FIG. 14. The error rate is a minimum when the read power is at 1402. As the quantity of reproducing light exceeds the optimum quantity and continues to increase, the read error rate slowly increases. As a result, the curve 1401 becomes asymmetric with respect to the point of the optimum quantity of reproducing light 1402. The curve 1401 represents a case where a different focus offset value is set, producing an error rate curve 1403. The error rate in the curve 1403 is lowest when the read power is at 1404. The offset value used to produce the curve 1403 is not the optimum focus offset value, because the read power at 1404 is higher than the power at 1402, and the power margin is narrow, as indicated by the curve 1403 shown in FIG. 14.

FIG. 15 is a flowchart of the operation of setting an optimum focus offset value in accordance with the seventh embodiment of the present invention. In FIG. 15, the same steps as in the flowchart of FIG. 5 are denoted by the same reference numerals as in FIG. 5. In FIG. 15, steps 1501, 1502, 1503, and 1504 are characteristic of this embodiment. In step 501, the operation of setting an optimum focus offset value starts. In step 502, the MPU 16 sends an instruction to the DSP 16 to drive the focusing actuator 37 and the tracking actuator 38 via the drivers 22 and 23, respectively, and thus performs a focus servo operation and a tracking servo operation to perform a seek operation on the test area 402 of the optical disk 401 shown in FIG. 4. In this embodiment, the focus offset is set at zero, and the quantity of recording light is set at a predetermined value in step 1501. The test area 402 is then cleared in step 504. In step 1502, data are written on the optical recording medium without an error correction code (ECC). In step 505, the MPU 13 supplies the register 301 with data that indicate the focus offset value is −X, and the supplied data are converted to an analog value by the D/A converter 302, which in turn outputs the focus offset value of −X. Upon input of a focus error signal of the DSP 16, the adder 303 adds the focus offset value to the focus control system. In this manner, the MPU 13 sets the focus offset value at −X. In step 1503, the quantity of reproducing light is set at −Y. In step 508, information is read out from the optical recording medium without an error correction. In step 509, the MPU 13 compares the reproduced information with all the information remaining in the buffer memory 12, and calculates the read error rate. More specifically, the recorded data and the reproduced data are compared bit by bit, so as to determine the number of error bits. Based on the proportion of the number of error bits to the total number of bits, the bit error rate is calculated. In step 510, this error rate, the focus offset value of −X, and the reproducing light quantity value of −Y, are stored in the register 304 in the MPU 13 shown in FIG. 3. In step 1504, the quantity of reproducing light is increased by α. In step 1505, it is determined whether the quantity of reproducing light reaches the value of +Y. If it is determined in step 1505 that the quantity of reproducing light has not reached the value of +Y, steps 508 through 1504 are repeated. If it is determined in step 1505 that the quantity of reproducing light has reached the value of +Y, the operation moves onto step 513, in which the focus offset value is increased by α. In step 514, it is determined whether the focus offset value has reached the value +X. If it is determined in step 514 that the focus offset value has not reached the value of +X, steps 1503 through 513 are repeated.

If it is determined in step 514 that the focus offset value has reached the value of +X, the operation moves on to step 515, in which an optimum focus offset value is determined. Here, the determination of an optimum focus offset value is conducted in the same manner as in the foregoing embodiments.

The embodiment described above with reference to FIG. 15 can be applied not only to a recording and reproducing device for an MSR-type magneto-optical (MO) recording medium, but also to a recording and reproducing device for any other magneto-optical (MO) recording medium.

On the other hand, the embodiment described above with reference to FIG. 15 can be selectively applied to a reproducing device or a recording and reproducing device for an MSR-type magneto-optical (MO) recording medium.

It should be noted that the present invention is not limited to the embodiments specifically disclosed above, but other variations and modifications may be made without departing from the scope of the present invention.

What is claimed is:

1. An optical recording device that is equipped with a focus control system for performing a focus control operation to focus light emitted from a light source onto a recording face of an optical recording medium, said device comprising:

a focus offset value setting unit for sequentially setting a focus offset value from a plurality of offset values;

an adder unit for using the focus offset values set by the focus offset value setting unit to adjust the focus control system;

a light quantity setting unit for setting the quantity of recording light, which is emitted from the light source, at each of a plurality of predetermined values indicating the quantity of recording light for each of the focus offset values set by the focus offset value setting unit;

a recording unit for recording information on the optical recording medium using the quantity of recording light set by the light quantity setting unit with the focus offset value set by the focus offset value setting unit;

an error rate measuring unit for measuring an error rate in information reproduced from the information recorded by the recording unit; and an optimum focus offset value determining unit for determining an optimum focus offset value based on the error rate measured by the error rate measuring unit.

2. The optical recording device as claimed in claim 1, wherein the optimum focus offset value determining unit determines the optimum focus offset value to be the focus offset value that is set when the error rate is lowest and the quantity of recording light is smallest.

3. The optical recording device as claimed in claim 1, wherein the optimum focus offset value determining unit calculates the quantity of recording light and a weighted mean value of the error rate, so as to determine the optimum focus offset value to be the focus offset value that is set when the weighted mean value of the error rate is the lowest and the quantity of recording light is the smallest.

4. The optical recording device as claimed in claim 1, wherein the optimum focus offset value determining unit determines the optimum focus offset value to be the focus offset value that is set when a range of the quantity of the recording light with which the error rate is below a predetermined value is widest.

5. The optical recording device as claimed in claim 1, wherein the recording medium is divided into a plurality of zones, and said device further comprises a memory unit for storing the optimum focus offset value for each of the plurality of zones.

6. The optical recording device as claimed in claim 5, further comprising a control unit for supplying the adder unit with the optimum focus offset value corresponding to each of the plurality of zones stored in the memory unit, when a recording operation is performed on each of the plurality of zones.

7. The optical recording device as claimed in claim 1, wherein
the recording medium is divided into a plurality of zones, each of which has a test area, and
said device further comprises a memory unit for storing the optimum focus offset value for the test area of each of the plurality of zones.

8. The optical recording device as claimed in claim 7, further comprising a control unit for supplying the adder unit with the optimum focus offset value corresponding to each of the plurality of zones stored in the memory unit, when a recording operation is performed on each of the plurality of zones.

9. The optical recording device as claimed in claim 1, wherein
the recording medium is divided into a plurality of zones, each of which has a user area, and
said device further comprises a memory unit for storing the optimum focus offset value at the center of the user area of each of the plurality of zones.

10. The optical recording device as claimed in claim 9, further comprising a control unit for supplying the adder unit with the optimum focus offset value corresponding to each of the plurality of zones stored in the memory unit, when a recording operation is performed on each of the plurality of zones.

11. The optical recording device as claimed in claim 1, further comprising a non-volatile memory for storing the optimum focus offset value that is determined when said device is manufactured.

12. The optical recording device as claimed in claim 1, wherein the optimum focus offset value determining unit comprises a temperature measuring unit for measuring the temperature of said device, and updates the optimum offset value when the temperature of said device fluctuates after the optimum focus offset value is determined.

13. The optical recording device as claimed in claim 1, further comprising a time measuring unit,
wherein the optimum focus offset value determining unit updates the optimum focus offset value, when a predetermined period of time has passed since the determination of the previous optimum focus offset value.

14. The optical recording device as claimed in claim 1, further comprising an operation control unit for controlling each operation of the focus offset value setting unit, the light quantity setting unit, the recording unit, and the optimum focus offset value determining unit,
wherein the operation control unit stops the operation of each of the units when a predetermined period of time has passed.

15. The optical recording device as claimed in claim 1, further comprising an operation control unit for controlling each operation of the focus offset value setting unit, the light quantity setting unit, the recording unit, and the optimum focus offset value determining unit,
wherein the operation control unit does not stop the operation of each of the units until the optimum focus offset value determining unit determines the optimum focus offset value.

16. The optical recording device as claimed in claim 1, wherein the optimum focus offset value determining unit determines the optimum focus offset value to be zero, when an erase operation is performed on the optical recording medium.

17. An optical recording device that is equipped with a focus control system for performing a focus control operation to focus light emitted from a light source onto a recording face of an optical recording medium, and reproduces information from the optical recording medium,
said device comprising:
a focus offset value setting unit for sequentially setting a plurality of offset values;
an adder unit for using the focus offset values set by the focus offset value setting unit to adjust the focus control system;
a light quantity setting unit for sequentially setting a quantity of reproducing light which is emitted from the light source, at each of a plurality of predetermined values indicating the quantity of recording light for each of the focus offset values set by the focus offset value setting unit;
a reproducing unit for reproducing information from the optical recording medium, using the quantity of reproducing light set by the light quantity setting unit;
an error rate measuring unit for measuring an error rate in the information reproduced from the optical recording medium; and
an optimum focus offset value determining unit for determining an optimum focus offset value based on the error rate measured by the error rate measuring unit.

18. A method of determining an optimum focus offset value for a focus control system that performs a focus control operation to focus light emitted from a light source onto a recording face of an optical recording medium,
said method comprising the steps of:
sequentially setting a focus offset value from a plurality of offset values for the focus control system;
using each focus offset value set in the focus offset value setting step to adjust the focus control system;

sequentially setting a quantity of recording light which is emitted from the light source, at each of a plurality of predetermined values indicating the quantity of recording light for each of the focus offset values set in the focus offset value setting step;

recording information on the optical recording medium using the quantity of recording light set in the light quantity setting step with the focus offset value set in the focus offset value setting step;

reproducing the information recorded in the recording step;

measuring an error rate in the reproduced information; and determining an optimum focus offset value based on the error rate measured in the error rate measuring step.

19. The method of determining an optimum focus offset value as claimed in claim 18, wherein in the optical focus offset value determining step, the optimum focus offset value is determined to be the focus offset value that is set when the error rate is lowest and the quantity of recording light is smallest.

20. The method of determining an optimum focus offset value as claimed in claim 18, further comprising the steps of:

calculating the quantity of recording light and a weighted mean of the error rate; and determining the optimum focus offset value to be the focus offset value that is set when the weighted mean value of the error rate is the lowest and the quantity of recording light is the smallest.

21. A method of determining an optimum focus offset value for a focus control system that performs a focus control operation to focus light emitted from a light source onto a recording face of an optical recording medium, said method comprising the steps of:

sequentially setting a plurality of offset values for the focus control system;

using each focus offset value set in the focus offset value setting step to adjust the focus control system;

sequentially setting a quantity of reproducing light which is emitted from the light source, at each of a plurality of predetermined values indicating the quantity of reproducing light for each of the focus offset values set in the focus offset value setting step;

reproducing information from the optical recording medium, using the quantity of reproducing light set in the light quantity setting step;

measuring an error rate in the information reproduced from the optical recording medium; and determining an optimum focus offset value based on the error rate measured in the error rate measuring step.

* * * * *